Patented Mar. 11, 1924.

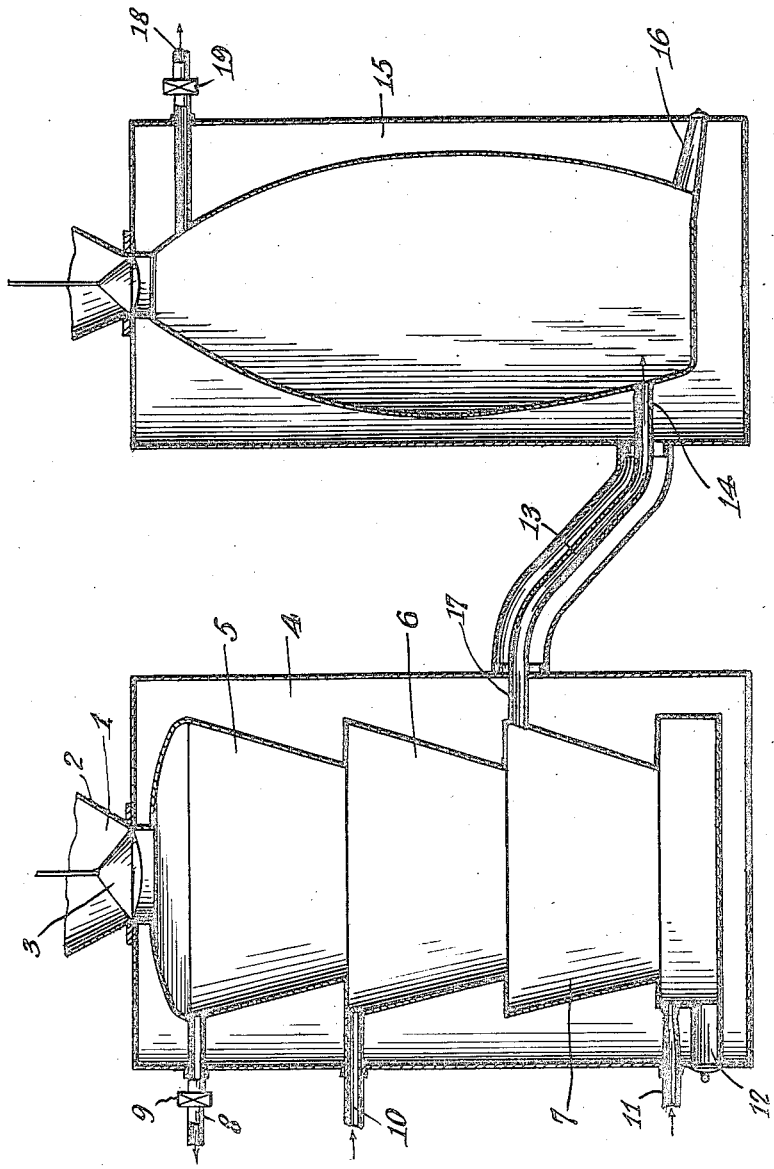

1,486,370

UNITED STATES PATENT OFFICE.

EMIL FLEISCHER, OF DRESDEN, GERMANY, ASSIGNOR, BY MESNE ASSIGNMENTS, TO THE CHEMICAL FOUNDATION, INC., A CORPORATION OF DELAWARE.

HOT-GAS PROCESS FOR THE REDUCTION AND SMELTING OF METALS.

Application filed September 10, 1917. Serial No. 190,664.

*To all whom it may concern:*

Be it known that I, DR. EMIL FLEISCHER, chemist, a subject of the German Emperor, and resident of Dresden, Saxony, Germany, have invented new and useful Hot-Gas Processes for the Reduction and Smelting of Metals, of which the following is a specification.

In accordance with a previous invention I have been able to obtain a producer gas free from carbon dioxide and steam and at a temperature above 1000° C. which is briefly termed hot gas.

This hot gas is composed of a mixture of carbon monoxide and nitrogen. In producing the hot gas according to the earlier process disclosed in the Patent Number 1,178,391, a small volume of the hot gas must pass through the upper portions of the fuel for heating the same, whilst the greater volume of the hot gas is drawn off from the hottest zone of the producer. The heating required, by a part of the hot gas may, obviously, be reduced, the warmer the fuel is introduced into the producer, and it may be entirely dispensed with if the said fuel is charged approximately at the same temperature as the hot-gas to be produced therefrom.

In manufacturing the hot gas the ash contents of the fuel may be removed in the usual manner as slag, but it has been found to be more advantageous to tap the slags while in a thin liquid state. After numerous experiments I have determined the conditions in accordance with which a thin liquid slag may with certainty be obtained from any fuel of known analysis. These conditions stipulate at least one molecule of alumina to three molecules of silicon, and that the total of the molecules of the divalent bases must, at least, be equal to that of the silicon.

In such thin liquid slags the iron contents of the ash of the fuel will segregate as pig-iron, and this will also be the case if to the fuel, for example coke, in the producer, iron ores are added. In this case therefore, a metallurgical process takes place within the hot gas producer. This will, however, in consequence of the carbon dioxide formed during the reduction of the ore, impair the quality of the gas produced to such an extent that it can be used only for reducing very readily reducible ores, with which—contrary to the reduction of iron ores—a high percentage of carbon dioxide will not interfere.

For the reduction of iron from its ores and obtaining pig iron I have discovered a new hot gas process, which, circumventing the blast furnace allows of a considerable saving in fuel and which may be carried out in the following way.

The iron ore is reduced, after addition of coke or coal, in a separate shaft reducing furnace 15, through which hot gas is conducted, to spongy iron. The product which is from time to time removed through a tap opening 16, is then charged into a hot-gas producer 4, with coke in alternate layers, and hot air is admitted into the producer from below at 11. Thereby the reduced spongy iron with the slags are melted and a pig iron is obtained. At the same time, however, a hot gas of very good quality (i. e. free from carbon dioxide) is obtained, which is again conducted into the reducing furnace, and there serves to reduce a fresh volume of ore to spongy iron equalling in weight the pig iron obtained in the hot gas producer. The present process, consists of a circulatory process. The reducing furnace consumes hot-gas and supplies the reduced ore for the metallurgical hot-gas producer, whereas the latter smelts the iron and at the same time produces the hot-gas which is required to supply the reducing furnace in order to produce the same volume of spongy iron as before.

The said hot-gas producer, which I have termed a metallurgical hot-gas producer, therefore differs from the ordinary hot-gas producer essentially in that it not only produces hot-gas, but also smelts metals, so that it is not only charged with fuel but also with ores which have already been reduced. This also is, a feature distinguishing it from other producers; the latter, however, cannot, above all, produce hot-gas, which requires special arrangements according to the hereinbefore mentioned hot-gas process.

Due to the fact that the hot-gas is drawn off deep below the charging mouth, the metallurgical hot-gas producer must have a projection in its inner lining, in order to produce an incline for charging, and an empty space surrounding the projection, through which the hot-gas may escape. According to the size of the producer the part thereof beneath the blast nozzles, which serves to receive the pig-iron and the slags, may be constructed in resemblance to a blast furnace or a cupola. When the charge is to be introduced cold, it will, be necessary to provide that a part of the hot-gas will leave the producer just beneath the charging mouth, and so heat the upper portion of the charge; this part of the hot gas, also termed cool gas, is regulatable in volume by means of a valve, gate or the like in the cool gas escape pipe, whereby also the temperature of the hot-gas may be controlled. The height of the metallurgical producer need not exceed that of ordinary cupolas, and may often be lower, because it is, in fact, only a special type of smelting furnace producing hot-gas and not a true blast furnace.

An illustrated embodiment of an apparatus in which the invention may be carried to practical effect is shown in the accompanying drawing.

As will be seen from this drawing, the metallurgical hot gas producer having at its top a hopper 1, with a retaining wall 2, and provided with a charging bell 3, is divided into three interconnected compartments. In order to provide means for continuing the combustion, air is introduced by means of an inlet pipe 11 beneath the lowermost compartment 7. The hot gas is thereby produced in the lowermost compartment, the greater portion of which gas is then conducted from this compartment by means of an outlet pipe 17. The smaller portion of the hot gas, which quantity may be regulated by a valve 9 in the uppermost exit tube 8, passes through a preliminary heating chamber 6. Into this chamber there is introduced a secondary air current through a tube 10. This air may preferably be mixed with steam, and through its effect the hot gas is burned, the products of which then pass into the uppermost compartment 5, where they serve to bring about not only a preliminary heating, but a distilling of the charge. In consequence of the hot gases passing through the uppermost or distilling compartment 5, the charge passing from compartment 5 to compartment 6 reaches the latter in a highly heated state. The mixed gases and vapors produced in the distilling compartment 5 are discharged through an exit tube 8, provided with a regulatory valve 9, through which it is conveyed to suitable apparatus for removing the tar and ammonia. The hot gas producer has at its base a suitable opening 12, through which the molten iron and intermingled slag is removed. The hot gas produced in the lowermost compartment 7 of the metallurgical hot gas producer 4, passing out through the exit tube 17 and hence by means of the connecting conduit 13 to the inlet tube 14, enters into a shaft reducing furnace 15. The hot gases passing upward through the furnace serve to reduce the ore to the condition of spongy iron, and are then led away through exit tube 18 provided with a valve 19 for regulating the speed with which the gases will pass upward through the furnace. The furnace is also provided with a tap opening 16, through which the spongy iron may be removed from time to time.

The essential feature of the present process, resides in the hereinbefore mentioned circulatory procedure which is only rendered possible by the hot-gas. It is possible to separate the reduction of the iron from its smelting under thermally very favorable conditions, a fact which is of high chemical importance. It is immaterial whether the ore alone is reduced in the reducing furnace, and the spongy iron obtained is charged with admixtures and fuel into the metallurgical hot-gas producer, or whether the said admixtures are added to the ore in the reducing furnace and there subjected to the reduction process, whereupon which, with coke is charged into the metallurgical hot-gas generator. In both instances the object of the present process, i. e. to treat in the metallurgical hot-gas producer ore which has been reduced, is attained, so that the purpose of the present invention is carried out. It is quite obvious that this process may be employed not only for iron, but also for ores of non-volatile metals, such as nickel, cobalt, copper and the like, so that these metals may also be manufactured in accordance with the process forming the subject matter of the present invention.

For reducing metals other than iron, or also for annealing iron, copper, nickel and the like, without any oxidizing effect the characteristic of the hot-gas, discovered by the applicant may be employed, namely that it will produce flames having a temperature above 1200° C. and containing more than twice as much carbon monoxide as carbon dioxide.

If common producer gas is burnt with only such a volume of air, that the flame gases shall contain twice as much reducing gases (carbon monoxide, hydrogen, methane) as oxidizing gases (carbon dioxide and steam)—and even if producer gas of a temperature of 500° C. and additional combustion air of the same temperature is used—flame gases of barely 1000° C. will be obtained owing to the carbon dioxide and steam contained in the producer gas. This is entirely different with the hot-gas, free from carbon dioxide and steam and having a temperature of 1100° C. If, namely, only one third of the hot-gas supplied is burnt with cold air, the flame will contain one part of carbon dioxide to 2 parts of carbon monoxide, and have a temperature of approximately 1500° C. If combustion air of 500° C. had been used, the temperature of the flame would almost reach 1600° C. In an analogous manner, by partly burning the hot-gas, reducing flames may be produced, which contain four times as much carbon monoxide as carbon dioxide, and by using cold combustion air a temperature within the flame of more than 1300° C. and by using hot air a temperature of more than 1400° C. is obtained.

This characteristic feature of the hot-gas resides partly, and particularly, in its high specific heat, and partly in the fact that it is composed of a mixture of carbon monoxide and nitrogen, which does not contain any carbon dioxide or any steam. Reducing flames having a temperature of more than 1200° C. cannot be obtained with common producer gas which always contains considerable quantities of carbon dioxide and steam.

The reducing power of these hot reducing flames, produced with hot-gas, is such that iron, nickel, cobalt and the like when annealed therein will not be oxidized. On the other hand the oxides of lead, tin, and copper may be reduced therein, and the metals, freed from oxygen, may be smelted thereby.

It is obvious that these very hot and highly reducing flames, which may be produced by means of hot-gas, and which it was heretofore practically not possible to obtain, may be the medium of the hot-gas providing entirely new means and opportunities in the metal industries.

I claim:

1. A method for the reduction of metal ores which comprises reducing the ores by means of hot-gas in a separate reducing furnace to the condition of spongy metal and gangue, mixing said spongy metal and gangue with suitable fluxing material, charging said mixture with coke into a metallurgical, hot-gas producer, and smelting the mixture to produce pig-iron and slag while producing at the same time an amount of hot-gas sufficient to reduce an equivalent amount of iron from its ore.

2. A process for the production of metals from their ores which comprises charging metalliferous material which has been reduced from its ore and has been mixed with a suitable fluxing material into a hot-gas producer, blowing air into the charge, melting the resulting metal and slag so that the metal may be tapped off, producing during the reduction of the ore a hot-gas substantially free from carbon dioxide and at a temperature above 1000° C., drawing off the greater part of the hot-gas from the zone of maximum temperature of the charge, and passing the remainder of the hot-gas through the charge in order to heat said charge sufficiently to prevent the lowering of the temperature at the point of withdrawal of the hot-gas.

3. A method for the reduction of metal ores comprising reducing the ores by means of hot-gas in a separate reducing furnace to the condition of spongy metal and gangue, mixing said spongy metal and gangue with silicious material, charging said mixture with coke in alternate layers into a metallurgical, hot-gas producer, and smelting the mixture to produce pig-iron and slag while producing at the same time an amount of hot-gas sufficient to reduce an equivalent volume of iron from its ore.

4. A process for producing high-temperature, highly-reducing flames by means of hot-gas, which comprises effecting an incomplete combustion of the hot-gas so that a flame is produced which contains at least twice as much carbon monoxide as it does carbon dioxide and has a temperature of at least 1200° C., whereby said flame will act to reduce metallic oxides and permit the heating of the metal content thereof without substantial oxidation.

In testimony that I claim the foregoing as my invention, I have signed my name, in presence of two witnesses, this 7th day of July, 1917.

Dr. EMIL FLEISCHER.

Witnesses:
RICHARD WIRTH,
MELAME LEHR.